Patented Dec. 10, 1946

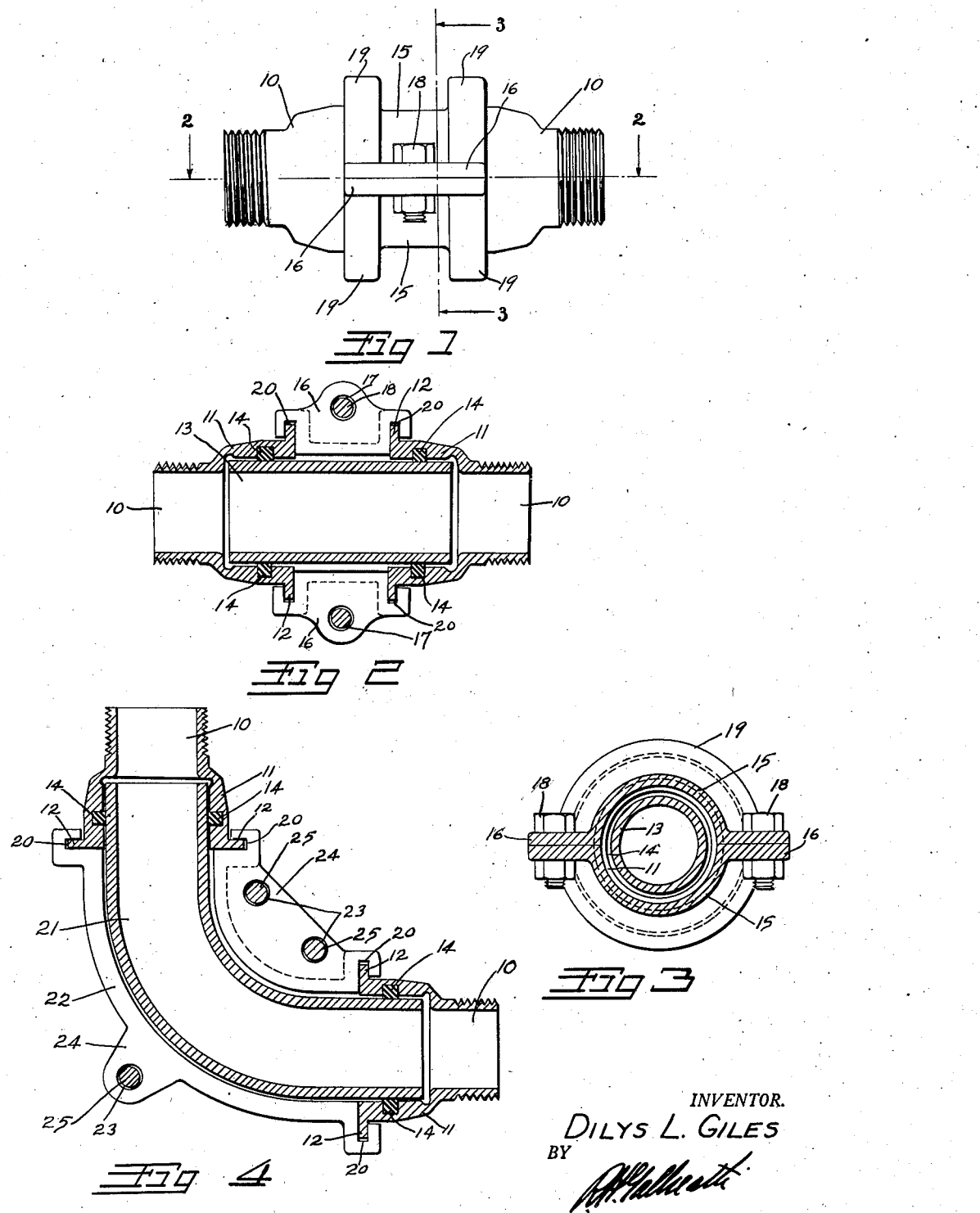

2,412,394

UNITED STATES PATENT OFFICE 2,412,394

PIPE COUPLING

Dilys L. Giles, Burbank, Calif.

Application November 12, 1943, Serial No. 510,051

1 Claim. (Cl. 285—97.5)

This invention relates to a swivel pipe fitting and has for its principal object the provision of a simple economical and highly efficient swivel pipe fitting which can be quickly and easily applied to the pipe without the use of unions; which will allow free rotative movement of the pipe without leakage; and in which there will not be mechanical damage or crushing of the sealing gaskets.

Other objects and advantages reside in the detail construction of the invention, which is designed for simplicity, economy, and efficiency. These will become more apparent from the following description.

In the drawing:

Fig. 1 is a side elevation illustrating a straight form of the improved fitting;

Fig. 2 is a longitudinal section thereof, taken on the line 2—2, Fig. 1;

Fig. 3 is a cross section therethrough, taken on the line 3—3, Fig. 1; and

Fig. 4 is a longitudinal section through the invention arranged as an elbow fitting.

The improved fitting consists of two similar terminal nipples, which may be provided at their outer extremities with either male or female threads on flanges on blank ends for welding (male threads have been illustrated). The inner extremities of each nipple is enlarged to form a bell-like socket 11 terminating in a peripheral flange 12.

The two niples are sealed to each other by means of an inner tube 13, having the same internal diameter as the nipples. The extremities of the tube 13 extend into the belled extremities 11 of the nipples. The nipples are sealed to the tube 13 by means of suitable resilient, annular sealing gaskets 14 which are carried in internal ring grooves in the sockets 11, and which are compressed between the grooves and the tube snugly engaging the outer surfaces of the latter. The two nipples are maintained in proper spaced relation on the extremities of the tube 13 by means of a split collar 15 formed in two similar half sections. Each section is provided with bolt flanges 16 containing suitable bolt openings 17 for the reception of clamp bolts 18. The collar 15 is enlarged at its extremities as shown at 19, and these enlarged extremities contain an internal groove 20 for the reception of the flanges 12.

The simplicity of the improved coupling can be readily seen. It consists of only three different parts, since the two nipples 10 and the two halves of the collar 15 are duplicates. It is not necessary that the connection between the collar and the nipples be fluid tight since the fluid is stopped off by the gaskets 14. No strains are placed upon the gaskets to crush or deform the latter since all stresses are absorbed by the flanges 12. The nipples are free to rotate with their flanges 12 sliding in the groove 20 of the collar and with the gaskets 14 sliding on the tube 13. The outer surface of the latter may be ground on a centerless grinder to accurate dimension so that a perfect seal is obtained at any point thereon. Any wear will occur between the gaskets and the tube. The elements can be economically replaced.

In Fig. 4, an alternate form of the invention is illustrated employing exactly the same principle. In this form, the same nipples 10 are used with their gaskets 14 slipped over the extremities of a curved tube 21. The tube 21 may be curved to any desired angle. As illustrated it is formed as a 90° elbow. A curved housing 22, formed in two halves, is clamped about the curved tube 21 by means of clamp bolts 25 passing through suitable bolt holes 23. The bolt holes 23 are formed in bolt flanges 24, projecting from the opposite sides of each half of the housing 22. The operation and advantages of this form are exactly the same as the previously described form. It also comprises only three different simple parts with the nipples 10 being interchangeable with the previous form.

While a specific form of the improvement has been illustrated herein, it is desired to be understood that the same may be varied, within the scope of the appended claim, without departing from the spirit of the invention.

Having thus described the invention, what is claimed and desired secured by Letters Patent is:

A fitting for connecting the extremities of two lengths of pipe so as to allow relative rotation of said lengths and to prevent relative angular or axial movement thereof comprising: two similar nipples; a threaded outer extremity on each nipple; a similar enlarged cylindrical socket on the inner extremity of each nipple; a peripheral flange surrounding the open extremity of each socket; a cylindrical inner tube terminating in each socket and connecting the two; an annular sealing gasket surrounding each extremity of said tube, said gaskets being mounted in grooves in said sockets; a split collar surrounding the inner tube intermediate said sockets and maintaining the latter separated; enlarged extremities on said collar provided with internal grooves in which said flanges are rotatably mounted; and means for securing the two halves of the split collar together.

DILYS L. GILES.